(12) United States Patent
Yabe et al.

(10) Patent No.: US 10,630,123 B2
(45) Date of Patent: Apr. 21, 2020

(54) ROTARY ELECTRIC MACHINE AND AIR CONDITIONING APPARATUS

(71) Applicant: Mitsubishi Electric Corporation, Tokyo (JP)

(72) Inventors: Koji Yabe, Tokyo (JP); Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 72 days.

(21) Appl. No.: 15/742,599

(22) PCT Filed: Aug. 21, 2015

(86) PCT No.: PCT/JP2015/073603
§ 371 (c)(1),
(2) Date: Jan. 8, 2018

(87) PCT Pub. No.: WO2017/033239
PCT Pub. Date: Mar. 2, 2017

(65) Prior Publication Data
US 2019/0068015 A1 Feb. 28, 2019

(51) Int. Cl.
*H02K 1/27* (2006.01)
*H02K 29/08* (2006.01)
(Continued)

(52) U.S. Cl.
CPC ......... *H02K 1/2766* (2013.01); *F25B 31/026* (2013.01); *H02K 1/27* (2013.01);
(Continued)

(58) Field of Classification Search
CPC ...... H02K 11/215; H02K 29/08; H02K 11/21; F25B 31/026
See application file for complete search history.

(56) References Cited

U.S. PATENT DOCUMENTS 5,900,686 A 5/1999 Tabata et al.
6,037,726 A 3/2000 Tabata et al.
(Continued)

FOREIGN PATENT DOCUMENTS

JP 06-327212 A 11/1994
JP 08-022914 A 1/1996
(Continued)

OTHER PUBLICATIONS

Office Action dated Oct. 9, 2018 issued in corresponding JP patent application No. 2017-536080 (and English translation).
(Continued)

*Primary Examiner* — Tran N Nguyen
*Assistant Examiner* — Minki Chang
(74) *Attorney, Agent, or Firm* — Posz Law Group, PLC

(57) ABSTRACT

A rotary electric machine includes a rotor core that rotates about a rotation axis, a plurality of first magnets disposed in a circumferential direction of the rotor core and embedded in the rotor core, a second magnet that includes a plurality of magnetic poles disposed in the circumferential direction of the rotor core and is disposed on an end surface of the rotor core in an extending direction of the axis, the second magnet being disposed at a position in a direction orthogonal to the axis, different from positions at which the plurality of first magnets are disposed, and a stator provided on an outer side of the rotor core in the direction orthogonal to the rotation axis.

11 Claims, 13 Drawing Sheets

(51) Int. Cl.
    *H02K 11/215*    (2016.01)
    *F25B 31/02*     (2006.01)
(52) U.S. Cl.
    CPC .......... *H02K 1/276* (2013.01); *H02K 11/215* (2016.01); *H02K 29/08* (2013.01)

(56) References Cited

U.S. PATENT DOCUMENTS

| | | |
|---|---|---|
| 6,054,818 A | 4/2000 | Tabata et al. |
| 2016/0285330 A1* | 9/2016 | Mukai ................ F04C 29/0057 |

FOREIGN PATENT DOCUMENTS

| | | |
|---|---|---|
| JP | 2000-333428 A | 11/2000 |
| JP | 2003-052159 A | 2/2003 |
| JP | 2003-111324 A | 4/2003 |
| JP | 2009-219291 A | 9/2009 |
| JP | 2012-205355 A | 10/2012 |
| JP | 2012-231602 A | 11/2012 |

OTHER PUBLICATIONS

International Search Report dated Nov. 2, 2015 issued in corresponding International patent application No. PCT/JP2015/073603.
Office Action dated Feb. 19, 2019 issued in corresponding KR patent application No. 10-2018-7001661 (and English translation).
Office Action dated Mar. 26, 2019 issued in corresponding CN patent application No. 2015800822475.2 (and English translation).

* cited by examiner

ROTARY ELECTRIC MACHINE AND AIR CONDITIONING APPARATUS

CROSS REFERENCE TO RELATED APPLICATION

This application is a U.S. national stage application of International Patent Application No. PCT/JP2015/073603 filed on Aug. 21, 2015, the disclosure of which is incorporated herein by reference.

TECHNICAL FIELD

The present invention relates to a rotary electric machine in which a permanent magnet is embedded in a rotor core, and also relates to an air conditioning apparatus.

BACKGROUND

A rotary electric machine is used as a power source of a device. Some rotary electric machines are controlled on the basis of the position of a rotor. Some of the rotary electric machines as described above include a sensor that detects the position of a rotor, and a magnet for the detection as disclosed in Patent Literatures 1 and 2.

PATENT LITERATURES

Patent Literature 1: Japanese Patent Application Laid-open No. 2000-333428
Patent Literature 2: Japanese Patent Application Laid-open No. 2012-205355

In the technique described in Patent Literature 1, a permanent magnet embedded in a rotor and a position detection magnet overlap to each other when these magnets are viewed from a direction of a rotation axis. Thus, there is a possibility that the position detection magnet is affected by a leakage flux from the permanent magnet, thereby the detection accuracy of the sensor is reduced. In the technique described in Patent Literature 2, a permanent magnet embedded in a rotor and a position detection magnet overlap to each other when these magnets are viewed from a radially outer side of the rotor. Thus, there is a possibility in that the position detection magnet is affected by a magnetic flux of the permanent magnet, thereby the detection accuracy of the sensor is reduced.

SUMMARY

An object of the present invention is to provide a rotary electric machine that can suppress a reduction in accuracy in detecting the position of a rotor including a permanent magnet.

A rotary electric machine according to an aspect of the present invention includes a rotor core, a plurality of first magnets, a second magnet, and a stator. The rotor core rotates about a rotation axis. The first magnets are disposed in a circumferential direction of the rotor core and embedded in the rotor core. The second magnet includes a plurality of magnetic poles disposed in the circumferential direction of the rotor core, and disposed on an end surface of the rotor core in an extending direction of the axis, the second magnet being disposed at a position in a direction orthogonal to the axis, different from positions at which the plurality of first magnets are disposed. The stator is provided on an outer side of the rotor core in the direction orthogonal to the rotation axis.

According to the present invention, there is an effect where it is possible to obtain a rotary electric machine that can suppress a reduction in accuracy in detecting the position of a rotor that includes a permanent magnet.

DETAILED DESCRIPTION

A rotor for a rotary electric machine, a rotary electric machine, and an air conditioning apparatus according to embodiments of the present invention will be described in detail below with reference to the accompanying drawings. The present invention is not limited to the embodiments. In the following embodiments, it suffices that the rotary electric machine includes a stator in which a wire is wound around a stator core, and the type of rotary electric machine is not particularly limited. Further, the rotary electric machine is not limited to a motor, that is, a device that generates power, and it is allowable that the rotary electric machine is a generator that generates electric power.

First Embodiment

Figure 1:
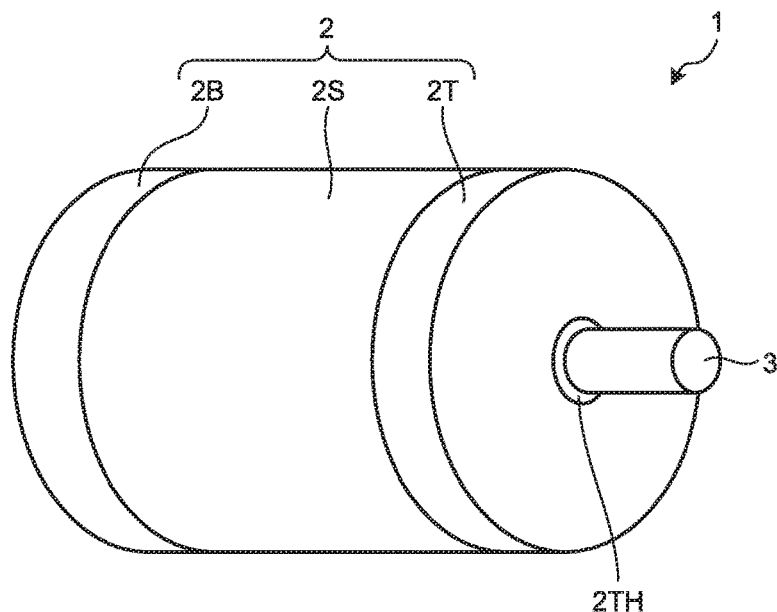
FIG. 1 is a perspective diagram of a rotary electric machine according to a first embodiment.
Figure 2:
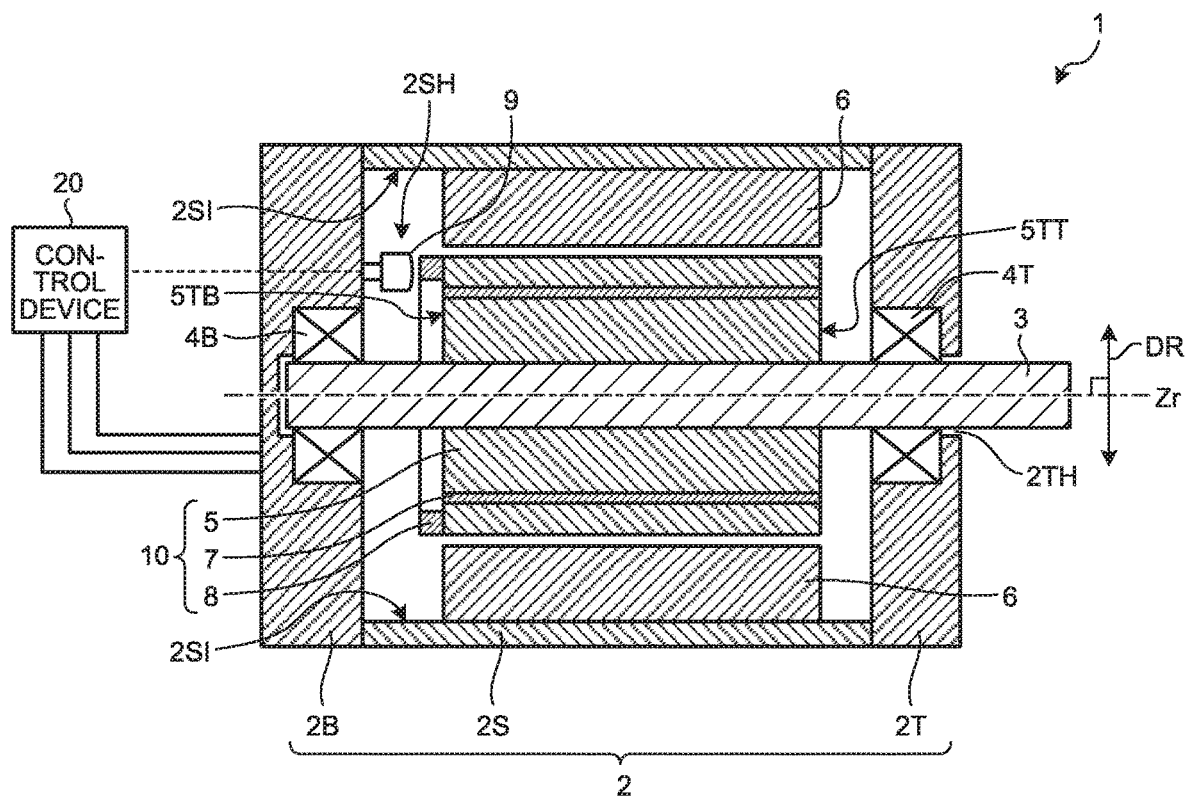
FIG. 2 is a cross-sectional diagram illustrating the rotary electric machine according to the first embodiment taken along a plane parallel to a rotation axis and passing through the rotation axis.

FIG. 1 is a perspective diagram of a rotary electric machine according to a first embodiment. FIG. 2 is a cross-sectional diagram illustrating the rotary electric machine according to the first embodiment taken along a plane parallel to a rotation axis and passing through the rotation axis. As illustrated in FIG. 1, a rotary electric machine 1 includes a casing 2 and a shaft 3. As illustrated in FIG. 2, the casing 2 accommodates therein a pair of bearings 4T and 4B that support the shaft 3, a stator 6, a rotor 10 for a rotary electric machine, and a sensor 9. The rotor 10 includes a rotor core 5 through which the shaft 3 is mounted, a driving permanent magnet 7 that is a first magnet embedded in the rotor core 5, and a position detection magnet 8 that is a second magnet disposed on an end surface of the rotor core 5. The shaft 3 and the rotor 10 rotate about a rotation axis Zr. In the following descriptions, the axis Zr is appropriately referred to as "rotation axis Zr".

The casing 2 includes a cylindrical side portion 2S, a first flange 2T attached to one end of the side portion 2S, and a second flange 2B attached to the other end of the side portion 2S. As illustrated in FIG. 2, the side portion 2S includes a through hole 2SH that extends in a direction parallel to the rotation axis Zr of the shaft 3 and the rotor 10. In the first embodiment, the side portion 2S has a cylindrical shape. However, the shape of the side portion 2S is not limited to the cylindrical shape.

The stator 6 is attached to an inner surface 2SI of the side portion 2S. The inner surface 2SI of the side portion 2S has a circular shape in cross section taken along a plane orthogonal to the rotation axis Zr. The stator 6 is disposed in the through hole 2SH of the side portion 2S. The stator 6 is provided on the outer side of the rotor core 5, which is included in the rotor 10, in a direction DR orthogonal to the rotation axis Zr. The rotor 10 is disposed on the inner side of the stator 6 in the direction DR orthogonal to the rotation axis Zr. The through hole 2SH of the side portion 2S is enclosed by the first flange 2T attached to one end of the side portion 2S and by the second flange 2B attached to the other end. Due to this structure, the stator 6 and the rotor 10 are accommodated in a space surrounded by the side portion 2S, the first flange 2T, and the second flange 2B, that is, in the through hole 2SH.

The first flange 2T includes a through hole 2TH through which the shaft 3, to which the rotor core 5 is attached, extends. The bearing 4T is installed in the through hole 2TH of the first flange 2T. The bearing 4B is installed in the second flange 2B. As described above, one end portion and the other end portion of the shaft 3 are supported by a pair of bearings 4T and 4B, respectively. Thus, the shaft 3 and the rotor 10 are supported by the first flange 2T and the second flange 2B through the pair of bearings 4T and 4B. In the first embodiment, the pair of bearings 4T and 4B is a ball bearing. However, the bearings 4T and 4B are not limited thereto.

The first flange 2T is a member of the rotary electric machine 1 located on the side from which the shaft 3 protrudes. A terminal through which power is supplied to the stator 6 of the rotary electric machine 1, and a terminal through which an output of the sensor 9 is extracted to the outside of the rotary electric machine 1 are attached to the second flange 2B.

The sensor 9 is attached on the second flange 2B on the side facing to the rotor 10. The sensor 9 is a magnetic sensor and is a Hall element in the first embodiment. The sensor 9 is not limited to the Hall element. The sensor 9 detects a magnetic flux from the position detection magnet 8.

The rotor 10 of the rotary electric machine 1 is an Interior Permanent Magnet (IPM) rotor. That is, the rotor 10 is of a type in which the driving permanent magnet 7 is embedded in the rotor core 5. The rotor 10 generates a torque by magnetic fluxes from the driving permanent magnets 7 and a magnetic flux from the stator 6, and rotates about the rotation axis Zr. The position detection magnet 8 is used for detecting the position of the rotor 10. A control device 20 controls the rotary electric machine 1. The control device 20 controls the rotary electric machine 1 using a magnetic flux from the position detection magnet 8 that is detected by the sensor 9.

Figure 3:
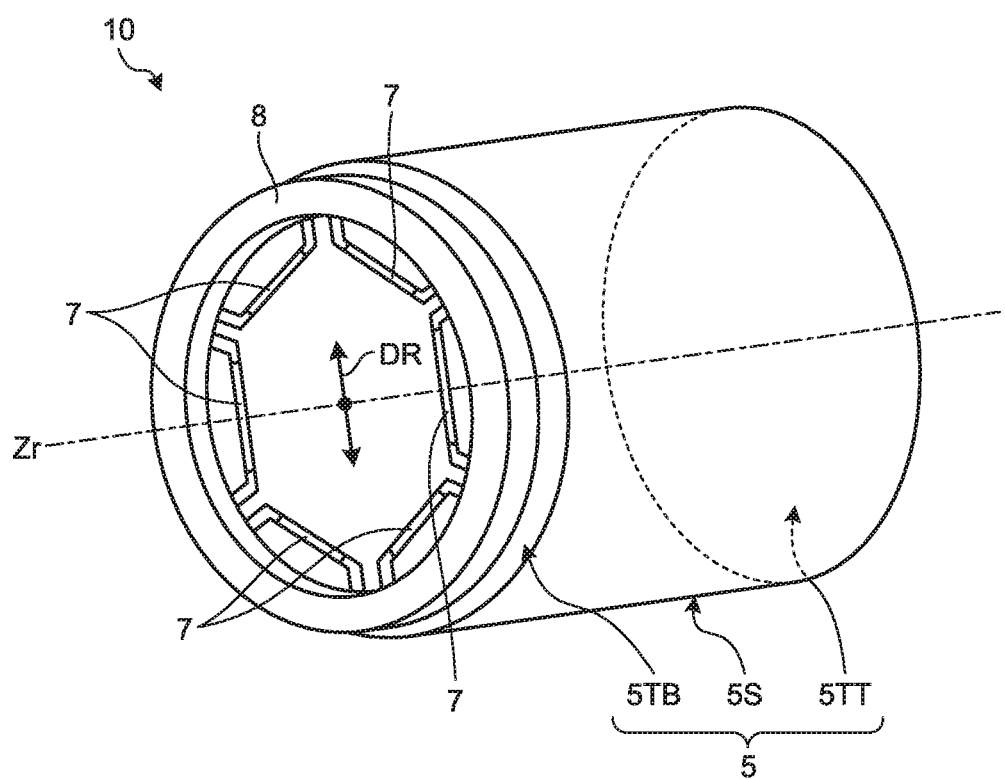
FIG. 3 is a perspective diagram of a rotor included in the rotary electric machine according to the first embodiment.

FIG. 3 is a perspective diagram of a rotor included in the rotary electric machine according to the first embodiment. The rotor core 5 of the rotor 10 is a cylindrical-shaped structure that includes side surface 5S with a cylindrical shape, a first end surface 5TT with a circular shape, and a second end surface 5TB with a circular shape. As illustrated in FIG. 2, the first end surface 5TT faces to the first flange 2T, while the second end surface 5TB faces to the second flange 2B. In the first embodiment, the rotor core 5 is formed by laminating a plurality of circular-shaped electromagnetic steel plates. However, the rotor core 5 is not limited to this structure. It is also possible that the rotor core 5 has a structure molded from powder of a magnetic material.

The rotation axis Zr passes through the center of the first end surface 5TT and the center of the second end surface 5TB of the rotor core 5. The position detection magnet 8 is disposed on an end surface of the rotor core 5 in the extending direction of the rotation axis Zr, more specifically, on the second end surface 5TB. In the following descriptions, the extending direction of the rotation axis Zr is appropriately referred to as "axial direction". The position detection magnet 8 is disposed at a position different from the positions at which a plurality of driving permanent magnets 7 are disposed in the direction DR orthogonal to the rotation axis Zr, that is, in the radial direction DR of the rotor core 5. In the first embodiment, the position detection magnet 8 is disposed on the outer side of the driving permanent magnets 7 in the radial direction DR of the rotor core 5. It is sufficient that the position detection magnet 8 is disposed at a position that does not overlap with the driving permanent magnets 7 in the radial direction DR of the rotor core 5. It is also allowable that the position detection magnet 8 is disposed on the inner side of the driving permanent magnets 7 in the radial direction DR.

Figure 4:
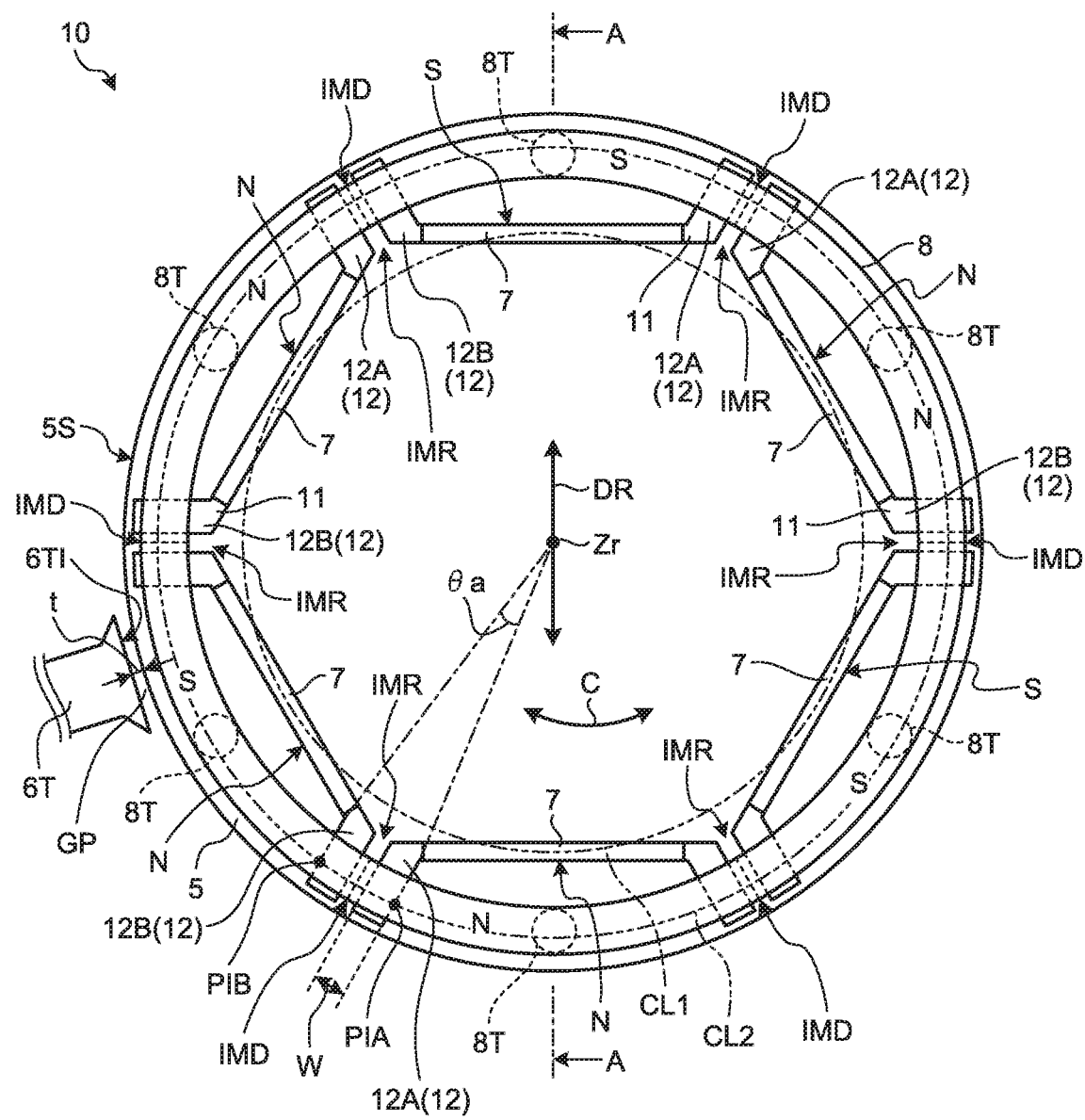
FIG. 4 is a plan view of the rotor according to the first embodiment as viewed from the side of a position detection magnet.
Figure 5:
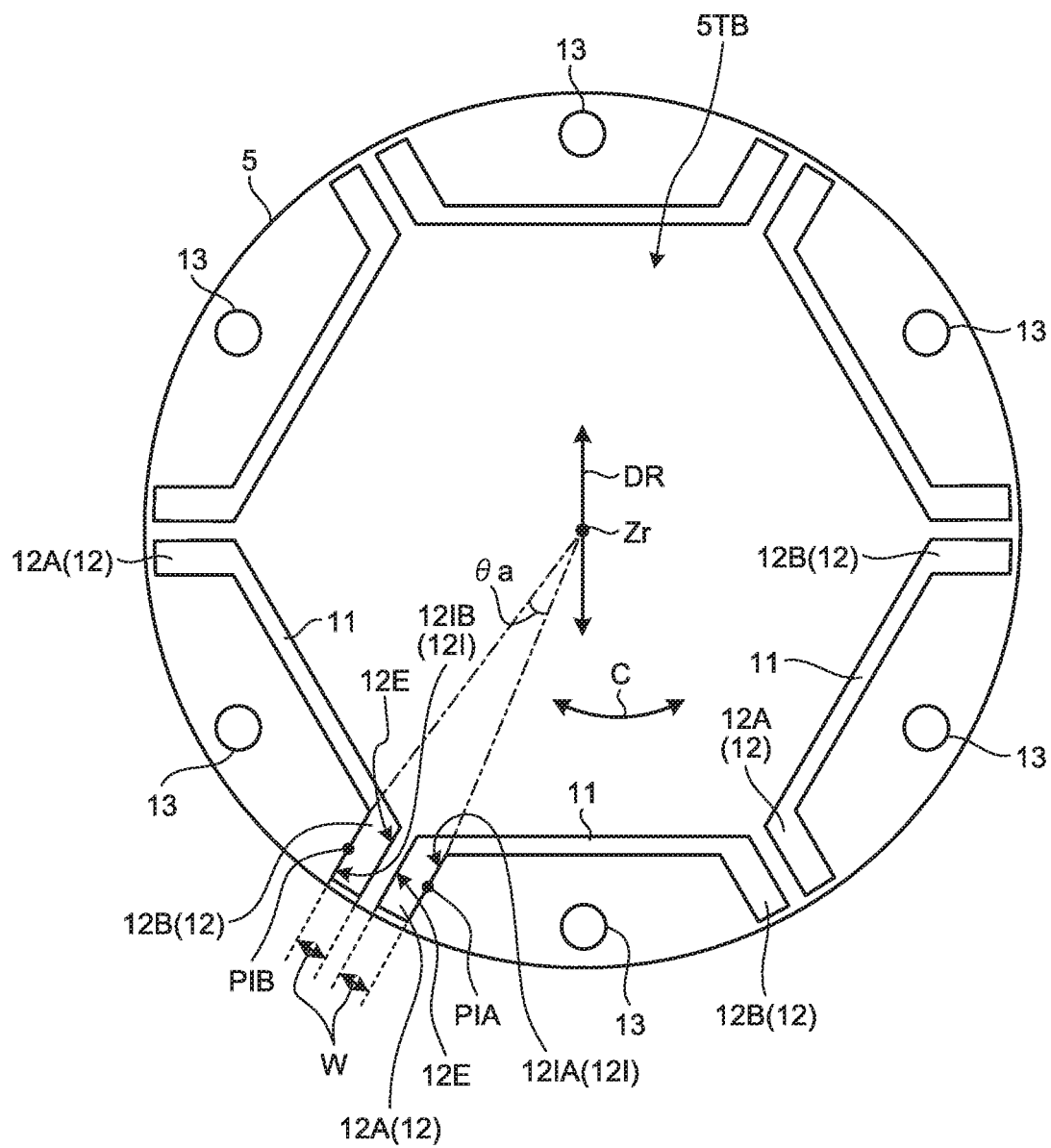
FIG. 5 is a plan view of a rotor core according to the first embodiment as viewed from the side of a second end surface.
Figure 6:
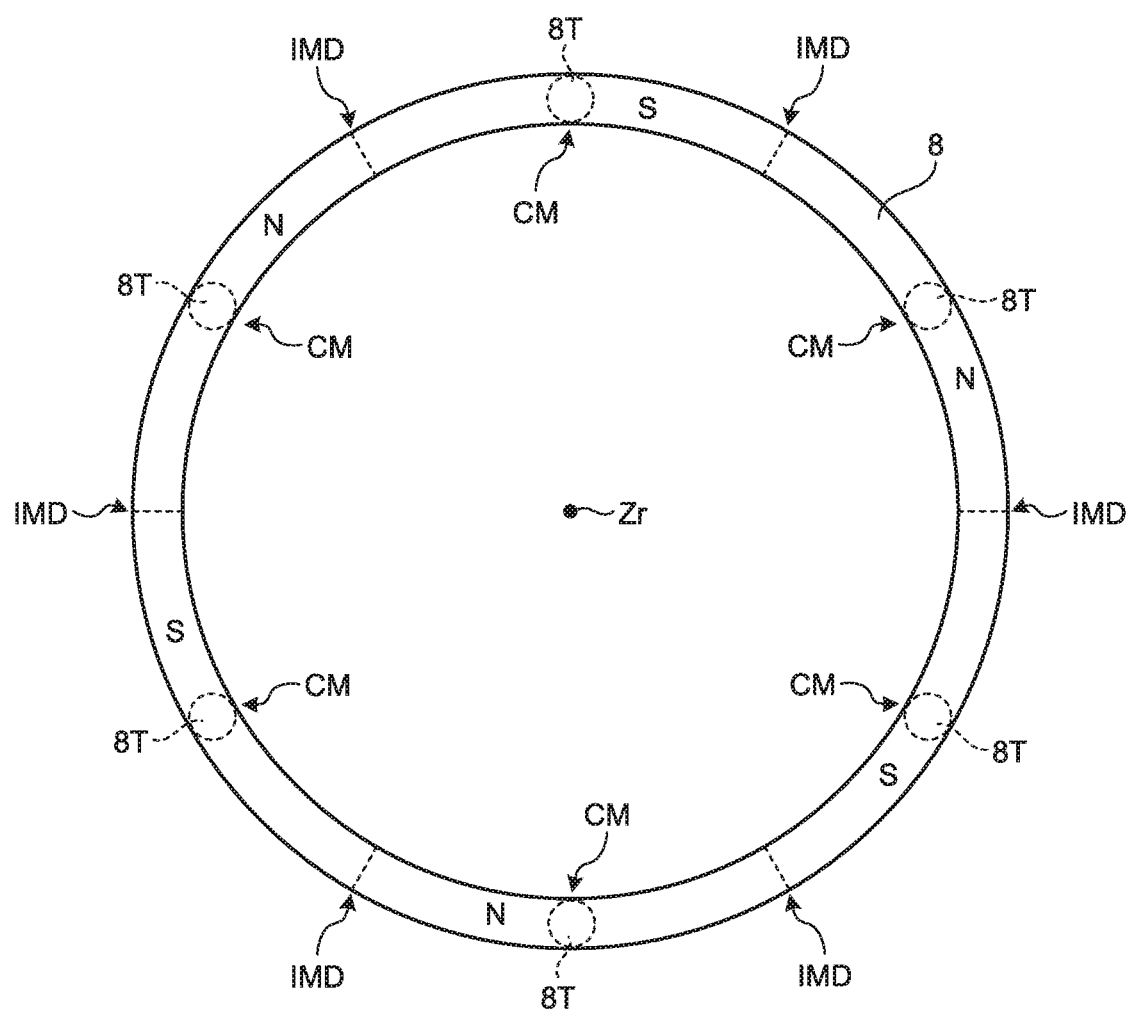
FIG. 6 is a plan view of the position detection magnet according to the first embodiment.
Figure 7:
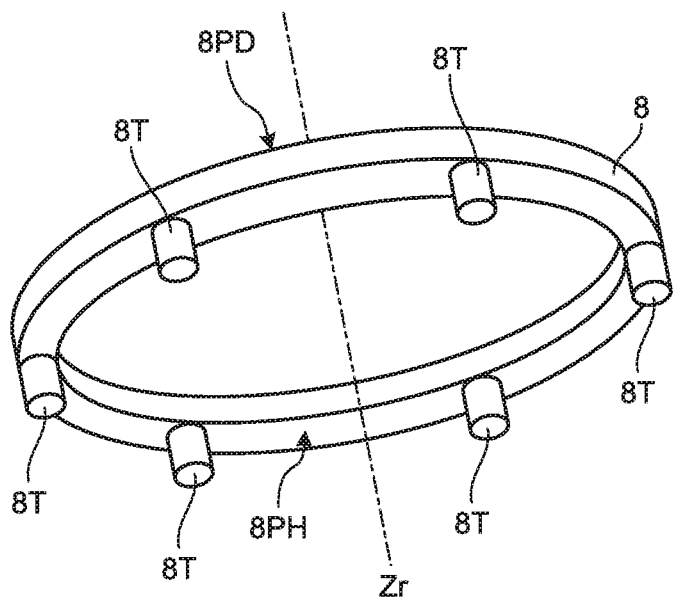
FIG. 7 is a perspective diagram of the position detection magnet according to the first embodiment.
Figure 8:
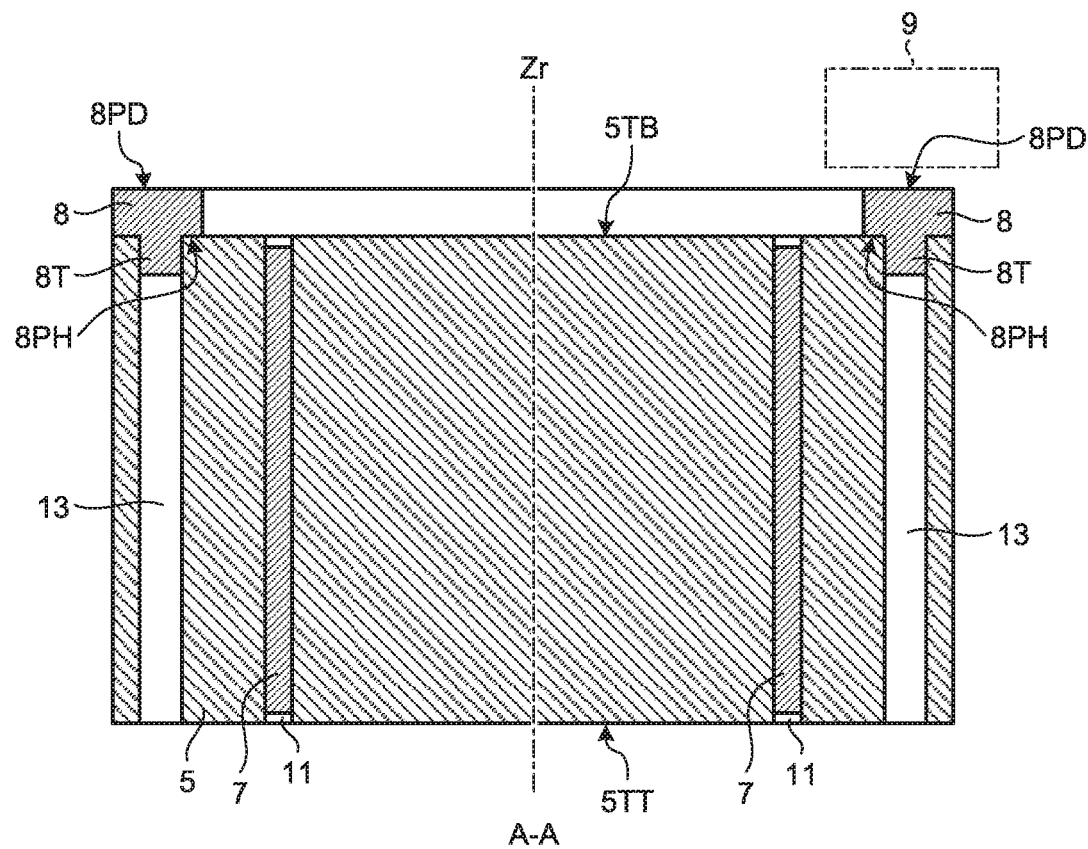
FIG. 8 is a view taken along an arrow A-A in FIG. 4.

FIG. 4 is a plan view of the rotor according to the first embodiment as viewed from the side of the position detection magnet. FIG. 5 is a plan view of the rotor core according to the first embodiment as viewed from the side of the second end surface. FIG. 6 is a plan view of the position detection magnet according to the first embodiment. FIG. 7 is a perspective diagram of the position detection magnet according to the first embodiment. FIG. 8 is a view taken along an arrow A-A in FIG. 4. FIG. 5 illustrates the rotor core 5 in a state in which the driving permanent magnets 7 are removed.

As illustrated in FIG. 4, the driving permanent magnets 7 are disposed in a circumferential direction C of the rotor core 5. In the first embodiment, the driving permanent magnets 7 are disposed along a first circle CL1 about the rotation axis Zr. The first circle CL1 is a circle with a smaller diameter than the rotor core 5. In the first embodiment, each of the driving permanent magnets 7 is installed in a through hole 11 that extends through the rotor core 5 in the extending direction of the rotation axis Zr of the rotor core 5 illustrated in FIG. 4 and FIG. 5, that is, in the axial direction. In the following descriptions, the through hole 11 is appropriately referred to as "first through hole 11". In the first embodiment, the driving permanent magnets 7 and the first through holes 11 are disposed on the circumference of the first circle CL1.

In the first embodiment, each driving permanent magnet 7 is a plate-like rectangular-shaped magnet. That is, each driving permanent magnet 7 is a magnet with a cuboid shape defined by six rectangular planes. Among the six planes of the driving permanent magnet 7, two largest planes are disposed to face to each other, while the remaining four planes connect the two largest planes. A direction orthogonal to the two largest planes of the driving permanent magnet 7 is a thickness direction of the driving permanent magnet 7. The thickness direction of the driving permanent magnet 7 is parallel to the radial direction DR of the rotor core 5. Thus, in a cross section orthogonal to the rotation axis Zr, the extending direction of the driving permanent magnet 7 and the first through hole 11 is parallel to a tangent of the first circle CL1. In the first embodiment, the driving permanent magnet 7 has a plate-like rectangular shape. However, the shape of the driving permanent magnet 7 is not limited thereto, and may also be cylindrical.

As illustrated in FIG. 4, the rotor core 5 includes two through holes 12 between adjacent driving permanent magnets 7. As illustrated in FIG. 5, the two through holes 12 extend through the rotor core 5 in the axial direction and are disposed in the circumferential direction C of the rotor core 5. In the following descriptions, the through hole 12 is appropriately referred to as "second through hole 12". In the first embodiment, the number of the second through holes 12 is not limited to two, but may be one, or three or more. In a case where there is one second through hole 12, it is allowable that the second through hole 12 is connected to its adjacent first through hole 11, or is independent from the first through hole 11.

A leakage flux from the driving permanent magnet 7 sometimes flows to its adjacent driving permanent magnets 7. This leakage flux flows through the position detection magnet 8, and thus affects a magnetic flux of the position detection magnet 8. Each of the second through holes 12 provided between corresponding two adjacent driving permanent magnets 7 serve as a magnetic reluctance, and accordingly can decrease the leakage flux from the driving permanent magnet 7. As a result, the second through holes 12 can reduce the influence of the leakage fluxes from the driving permanent magnets 7 on the magnetic flux of the position detection magnet 8.

The second through holes 12 radially extend in a direction parallel to the radial direction DR of the rotor core 5. Due to this structure, in a cross section orthogonal to the rotation axis Zr, each of the second through holes 12 is inclined with respect to the corresponding first through hole 11. In the first embodiment, the second through holes 12 connect with the corresponding first through hole 11. However, it is possible that the second through holes 12 do not connect with the corresponding first through hole 11, but are independent from the first through hole 11. In the following descriptions, one of the second through holes 12 connected to one end portion of corresponding one of the first through holes 11 in the circumferential direction C of the rotor core 5 is appropriately referred to as "second through hole 12A", and the other one of the second through holes 12 connected to the other end portion of the first through hole 11 is appropriately referred to as "second through hole 12B".

Magnetic poles of the driving permanent magnets 7, that is, an N-pole and an S-pole are alternately disposed in the circumferential direction C of the rotor core 5 close to the side surface 5S of the rotor core 5, that is, close to the stator 6 illustrated in FIG. 2. A portion between the adjacent driving permanent magnets 7 is an interpolar portion IMR of the rotor 10. In the following descriptions, the interpolar portion IMR of the rotor 10 is appropriately referred to as "first interpolar portion IMR". In the first embodiment, the rotor 10 includes six driving permanent magnets 7. Thus, there are three pairs of magnetic poles that are an N-pole and an S-pole. That is, the rotor 10 has six magnetic poles. In this case, there are also six first interpolar portions IMR. The number of the driving permanent magnets 7 included in the rotor 10 is not limited to six. Next, the position detection magnet 8 is described.

The position detection magnet 8 includes a plurality of magnetic poles, that are an N-pole and an S-pole, disposed in the circumferential direction C of the rotor core 5. In the first embodiment, the magnetic poles are disposed along a second circle CL2 about the rotation axis Zr. The second circle CL2 is a circle with a diameter that is smaller than that of the rotor core 5 and larger than that of the first circle CL1. In the first embodiment, as illustrated in FIGS. 4, 6, and 7, the position detection magnet 8 is an annular magnet that extends along the circumferential direction C of the rotor core 5. Because the position detection magnet 8 is an annular magnet, this reduces the occupation area of the position detection magnet 8 on the second end surface 5TB of the rotor core 5. Thus, the annular position detection magnet 8 can be easily disposed at a position different from the positions at which the driving permanent magnets 7 are disposed in the radial direction DR of the rotor core 5.

As illustrated in FIG. 4 and FIG. 6, in the position detection magnet 8, an N-pole and an S-pole are alternately disposed in a circumferential direction. A portion between the N-pole and the S-pole is an interpolar portion IMD of the position detection magnet 8. In the following descriptions, the interpolar portion IMD is appropriately referred to as "second interpolar portion IMD". The second interpolar portion IMD is a point at which the magnetic flux density of the position detection magnet 8 becomes zero. A magnetic pole center CM is located between adjacent second interpolar portions IMD. The sensor 9 illustrated in FIG. 2 detects the position of the rotor 10 using the second interpolar portion IMD of the position detection magnet 8. The position detection magnet 8 is magnetized in the axial direction. That is, in the position detection magnet 8, a section magnetized in a direction from an end surface 8PD facing to the sensor 9 toward an end surface 8PH on the side of the rotor core 5, and a section magnetized in a direction from the end surface 8PH toward the end surface 8PD are alternately disposed in a circumferential direction of the position detection magnet 8. The position detection magnet 8 is magnetized in the axial direction, and thus the sensor 9 can detect the second interpolar portion IMD of the position detection magnet 8 from a position facing to the side of the second end surface 5TB of the rotor core 5.

As illustrated in FIG. 7, the position detection magnet 8 includes protrusions 8T that protrude in the axial direction. Each of the protrusions 8T is a cylindrical-shaped portion that protrudes in the axial direction from the end surface 8PH that is on the side of the rotor core 5 of the position detection magnet 8. The shape of the protrusion 8T is not limited to a cylindrical shape, but may also be a polygonal columnar shape such as a quadrangular columnar shape or a hexagonal columnar shape. In the first embodiment, the position detection magnet 8 includes a plurality of protrusions 8T, more specifically, six protrusions 8T disposed in a circumferential direction. The protrusions 8T are used for positioning the rotor core 5 and the position detection magnet 8. It is sufficient that the position detection magnet 8 includes at least two protrusions for the purpose of positioning. Thus, as long as this condition is satisfied, the number of protrusions 8T is not particularly limited.

As illustrated in FIG. 5, the rotor core 5 includes holes 13 into which the protrusions 8T included in the position detection magnet 8 are respectively inserted. In the first embodiment, the rotor core 5 includes the holes 13 equivalent in number to the protrusions 8T. In the first embodiment, because the number of the protrusions 8T is six, the number of the holes 13 is also six. As illustrated in FIG. 8, in the first embodiment, each of the holes 13 extends through the rotor core 5 in the axial direction from the first end surface 5TT to the second end surface 5TB. each of the holes 13 may be a bottomed hole. In this case, it is sufficient that the hole 13 is opened toward the second end surface 5TB and is deeper than the height of the protrusion 8T.

In the first embodiment, the position detection magnet 8 is disposed on the outer side of the driving permanent magnets 7 in the radial direction DR of the rotor core 5. Accordingly, the holes 13 are provided on the radially outer side of the driving permanent magnets 7 in the radial direction DR of the rotor core 5. In a case where the position detection magnet 8 is disposed on the radially inner side of the driving permanent magnets 7 in the radial direction DR of the rotor core 5, each of the holes 13 is also provided on the radially inner side of the driving permanent magnets 7 in the radial direction DR of the rotor core 5.

The protrusions 8T of the position detection magnet 8 are inserted correspondingly into the holes 13 of the rotor core 5, and thereby the position detection magnet 8 is mounted onto the second end surface 5TB of the rotor core 5. By using the protrusions 8T and the holes 13, the position detection magnet 8 is mounted onto the rotor core 5 with a simple structure, while positioning of the position detection magnet 8 and the rotor core 5 can be achieved. The position detection magnet 8 and the rotor core 5 may be coupled to each other by additionally using an adhesive or a screw in order to firmly fix the position detection magnet 8 to the rotor core 5.

The holes 13 included in the rotor core 5 are hollow holes and thus affect magnetic fluxes of the driving permanent magnets 7. In the first embodiment, each of the holes 13 is disposed on, relative to the center of the corresponding driving permanent magnet 7 in the circumferential direction C of the rotor core 5, the outer side of the corresponding driving permanent magnet 7 in the radial direction DR. Thus, the holes 13 are disposed symmetrically to each other relative to the rotation axis Zr. On the second end surface 5TB of the rotor core 5, the length of the outer side of the driving permanent magnet 7 in the radial direction DR from the center of the driving permanent magnet 7 in the circumferential direction C of the rotor core 5, is greater than the length of the outer side of the driving permanent magnet 7 in the radial direction DR from the end portion of the driving permanent magnet 7 in the circumferential direction C. Thus, each hole 13 is disposed on the outer side of the corresponding driving permanent magnet 7 in the radial direction DR relative to the center of the driving permanent magnet 7 in the circumferential direction C of the rotor core 5. Consequently, the influence caused on the magnetic fluxes of the driving permanent magnet 7 is reduced.

In the first embodiment, as illustrated in FIG. 4, the first interpolar portion IMR between the adjacent driving permanent magnets 7, and the second interpolar portion IMD between the adjacent magnetic poles of the position detection magnet 8, that is, an N-pole and an S-pole are disposed at an identical position in the circumferential direction C of the rotor core 5. In this case, as illustrated in FIG. 4, the driving permanent magnets 7 are disposed away from the inner side of portions between the adjacent magnetic poles of the position detection magnet 8, that is, the second interpolar portions IMD in the radial direction DR of the rotor core 5.

The sensor 9 illustrated in FIG. 2 reads the second interpolar portions IMD of the position detection magnet 8. Thus, as the accuracy in detecting the second interpolar portions IMD by the sensor 9 is improved, the accuracy in detecting the position of the rotor 10 is improved. In the first embodiment, the position detection magnet 8 is disposed on the radially outer side of the driving permanent magnets 7 in the radial direction DR of the rotor core 5. Due to this disposition, the resolution of the sensor 9 to detect the interpolar portions IMD is improved. Accordingly, the accuracy in detecting the position of the rotor 10 by the sensor 9 is improved.

In an IPM rotary electric machine 1, in a case where the position detection magnet 8 is disposed on the inner side of the driving permanent magnets 7 in the radial direction DR of the rotor core 5, a space for disposing the position detection magnet 8 may not be ensured because of the presence of the shaft 3. Assuming that the position detection magnet 8 is disposed near the shaft 3, there is also a possibility that it is difficult to install the sensor 9 at a position facing to the position detection magnet 8 in the axial direction because of the presence of the bearing 4B that supports the shaft 3. When the position detection magnet 8 is disposed on the outer side of the driving permanent magnets 7 in the radial direction DR of the rotor core 5, it means that the position detection magnet 8 is disposed at a position away from the shaft 3 and the bearing 4B. Because the position detection magnet 8 is disposed in the manner described above, an advantage is derived that a space for the position detection magnet 8 and the sensor 9 can be easily ensured even in the IPM rotary electric machine 1.

In the first embodiment, the first interpolar portion IMR of the rotor 10, and the corresponding second interpolar portion IMD of the position detection magnet 8 are disposed at an identical position in the circumferential direction C of the rotor core 5. Due to this structure, in the rotor 10, the accuracy in detecting the second interpolar portions IMD by the sensor 9 can be improved. Further, the driving permanent magnets 7 are disposed away from the inner side of the second interpolar portions IMD of the position detection magnet 8 in the radial direction DR of the rotor core 5. Thus, there is a positional relation between the second interpolar portions IMD and the driving permanent magnets 7 in which they do not overlap each other. This structure can reduce the influence of the driving permanent magnets 7 on a magnetic flux of the position detection magnet 8. Accordingly, in the rotor 10, the accuracy in detecting the second interpolar portions IMD by the sensor 9 can be improved.

Figure 9:
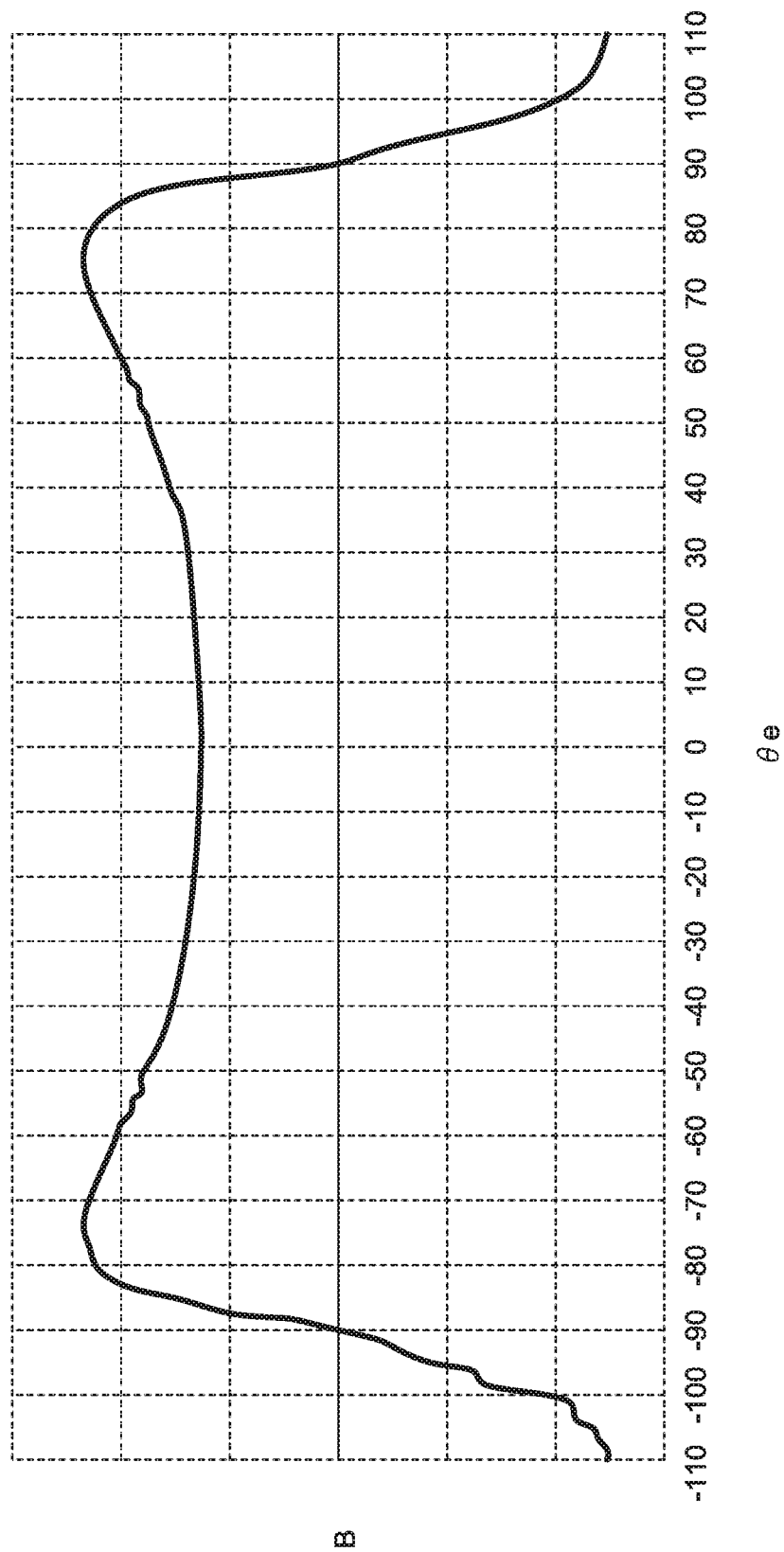
FIG. 9 is a diagram illustrating a waveform of a magnetic flux density of the position detection magnet detected by a sensor.

FIG. 9 is a diagram illustrating a waveform of a magnetic flux density of the position detection magnet detected by the sensor. In FIG. 9, the vertical axis represents a magnetic flux density B, and the horizontal axis represents an electrical angle θe of the position detection magnet 8. The position at which the electrical angle θe is 0 degree indicates the magnetic pole center CM of the position detection magnet 8 illustrated in FIG. 6. The second interpolar portion IMD is a point at which the magnetic flux density B becomes zero, that is, a position at which the electrical angle θe is −90 degrees and a position at which the electrical angle θe is +90 degrees. The magnetic flux density B of the position detection magnet 8 is sharply changed near the second interpolar portion IMD, more specifically, at an electrical angle θe of −90±10 degrees and an electrical angle θe of +90±10 degrees. In a case where the sensor 9 detects the position of the second interpolar portions IMD of the position detection magnet 8, it is preferable that the detection is not affected by the leakage fluxes from the driving permanent magnets 7. Thus, it is preferable that the driving permanent magnets 7 are disposed away from the inner side of the second interpolar portions IMD of the position detection magnet 8 in the radial direction DR of the rotor core 5, that is, disposed on the inner side of the radial direction DR of the rotor core 5 away from ranges where the electrical angle θe is −90±10 degrees and where the electrical angle θe is +90±10 degrees. This disposition can minimize the influence of the leakage fluxes from the driving permanent magnets 7 on the second interpolar portions IMD of the position detection magnet 8. Thus, the accuracy in detecting the second interpolar portions IMD by the sensor 9 can be improved.

The position detection magnet 8 is disposed on the outer side of the driving permanent magnets 7 in the radial direction DR of the rotor core 5 with a positional relation in which the position detection magnet 8 does not overlap with the driving permanent magnets 7. Accordingly, the influence of the leakage fluxes from the driving permanent magnets 7 on the position detection magnet 8 is reduced. This results in reducing disturbance in the waveform of the magnetic flux density B detected by the sensor 9. Consequently, the accuracy in detecting the second interpolar portions IMD by the sensor 9 can be improved. Further, the position detection magnet 8 is disposed only on the outer side of the driving permanent magnets 7 in the radial direction DR. Thus, it is unnecessary to dispose the position detection magnet 8 on the inner side of the driving permanent magnets 7 in the radial direction DR. As a result, the volume of the position detection magnet 8 included in the rotor 10 can be decreased. Accordingly, a reduction of materials used for the position detection magnet 8, and downsizing of the position detection magnet 8 are achieved.

In the first embodiment, as illustrated in FIG. 4 and FIG. 5, it is preferable that a dimension W of the second through hole 12 in the circumferential direction C of the rotor core 5 is 1.5 or more times greater than a dimension of a gap between the rotor core 5 and the stator 6. As illustrated in FIG. 5, the dimension W of the second through hole 12 is a distance between an inner wall 12I and an inner wall 12E that are facing to each other in the circumferential direction C of the rotor core 5. The inner wall 12I is a wall of the second through hole 12 closer to the first through hole 11. The inner wall 12E is a wall of the second through hole 12 closer to its adjacent second through hole 12. A gap between the rotor core 5 and the stator 6 refers to a gap GP illustrated in FIG. 4 between the side surface 5S of the rotor core 5 and a surface 6TI of teeth 6T included in the stator 6 closer to the rotor 10. In the following descriptions, a dimension of this gap GP is represented as t.

A magnetic flux of the driving permanent magnet 7 includes a magnetic flux that flows through the gap GP toward the stator 6, and a leakage flux that flows through the second through holes 12 to the adjacent driving permanent magnets 7. A part of the leakage flux flows through the position detection magnet 8, and thus affects a magnetic flux of the position detection magnet 8. In the first embodiment, the rotor 10 includes two second through holes 12 between driving permanent magnets 7 adjacent to each other. As described above, each of the second through holes 12 serves as a magnetic reluctance. Thus, assuming that the dimension W of the second through hole 12 is set 1.5 or more times greater than the dimension t of the gap GP, the magnetic reluctance of the second through hole 12 becomes three times greater than the magnetic reluctance of the gap GP. By setting the magnetic reluctance of the second through hole 12 greater than the magnetic reluctance of the gap GP, a leakage flux from the driving permanent magnet 7 can be reduced. As a result, the influence of the leakage fluxes from the driving permanent magnets 7 on the magnetic flux of the position detection magnet 8 is reduced. Accordingly, in the rotor 10, the accuracy in detecting the second interpolar portions IMD by the sensor 9 can be improved.

If the dimension W of the second through hole 12 is excessively increased, there is a possibility in that a sufficient size of the driving permanent magnet 7 cannot be ensured. Therefore, it is preferable that the dimension W of the second through hole 12 is set equal to or less than 2.0 times the dimension t of the gap GP. Due to this dimension, a sufficient size of the driving permanent magnet 7 can be ensured, while the accuracy in detecting the second interpolar portions IMD by the sensor 9 can be improved by securing a sufficient magnetic reluctance of the second through hole 12.

An angle formed by an inner wall 12IA of the second through hole 12A closer to one of the adjacent driving permanent magnets 7, the rotation axis Zr, and an inner wall 12IB of the second through hole 12B closer to the other adjacent driving permanent magnet 7 is defined as an angle θa. The angle θa is defined with reference to a position PIA of the inner wall 12IA of the through hole 12A at a detection position of the sensor 9, and a position PIB of the inner wall 12IB of the through hole 12B at the detection position of the sensor 9. Therefore, the angle θa is formed by the position PIA, the rotation axis Zr, and the position PIB. In the first embodiment, a detection position of the sensor 9 is on the circumference of the second circle CL2. However, the detection position is not limited to being on the circumference of the second circle CL2 as long as this position is on the end surface of the position detection magnet 8 facing to the sensor 9.

In the first embodiment, it is preferable that the angle θa is equal to or greater than the electrical angle θe of the position detection magnet 8, that is 20 degrees. The position detection magnet 8 has six poles that include three pairs of magnetic poles that are an N-pole and an S-pole. Thus, it is preferable that the angle θa is equal to or greater than 6.67 degrees when the angle θa is converted from the electrical angle θe to the central angle of the rotor core 5 about the rotation axis Zr.

The sensor 9 illustrated in FIG. 2 detects the second interpolar portions IMD of the position detection magnet 8. Accordingly, in order to reduce the influence of the magnetic fluxes of the driving permanent magnets 7 on a magnetic flux of the position detection magnet 8, it is preferable that an electromagnetic steel plate of the rotor core 5 is not present around the second interpolar portions IMD. The angle θa is set equal to or greater than the electrical angle θe of the position detection magnet 8, which is 20 degrees, and thereby hollows, that is, the second through holes 12 can be ensured around each of the second interpolar portions IMD of the position detection magnet 8. As a result, according to the rotor 10, the accuracy in detecting the second interpolar portions IMD by the sensor 9 can be improved.

If the angle θa is excessively increased, there is a possibility that a sufficient size of the driving permanent magnet 7 cannot be ensured. It is thus preferable that the angle θa is set equal to or smaller than the electrical angle θe of the position detection magnet 8, which is 30 degrees. In a case where the position detection magnet 8 has six poles, it is preferable that the angle θa is set equal to or smaller than 10 degrees. Due to this setting, while a sufficient size of the driving permanent magnet 7 is ensured, the accuracy in detecting the second interpolar portions IMD by the sensor 9 can be improved.

Figure 10:
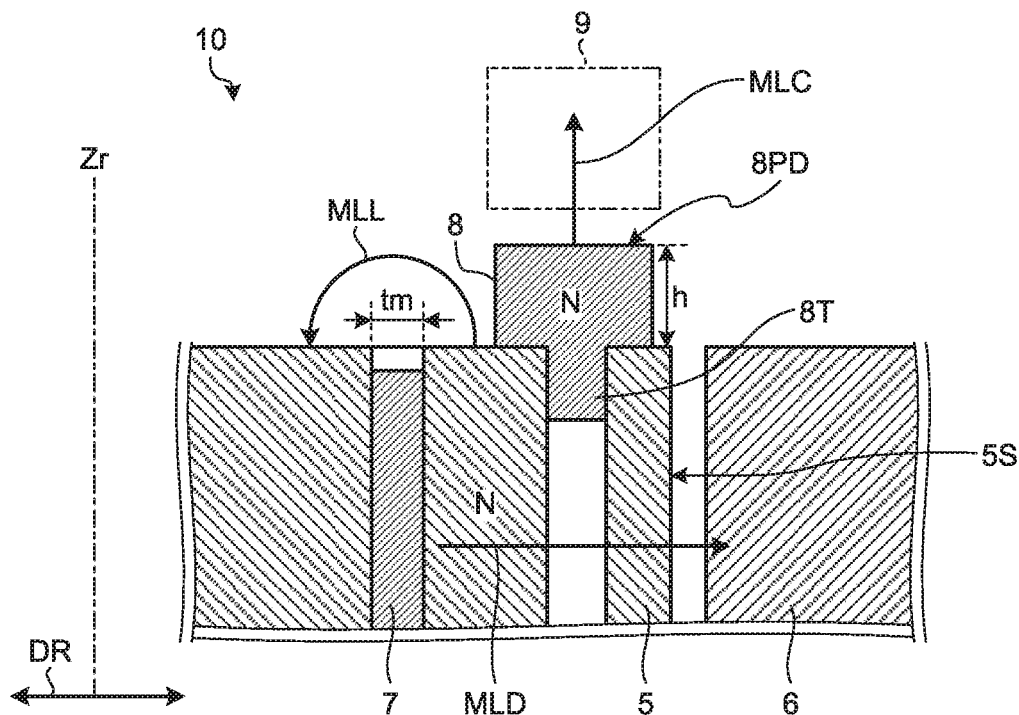
FIG. 10 is a diagram illustrating a magnetic flux of the position detection magnet and a magnetic flux of a driving permanent magnet.
Figure 11:
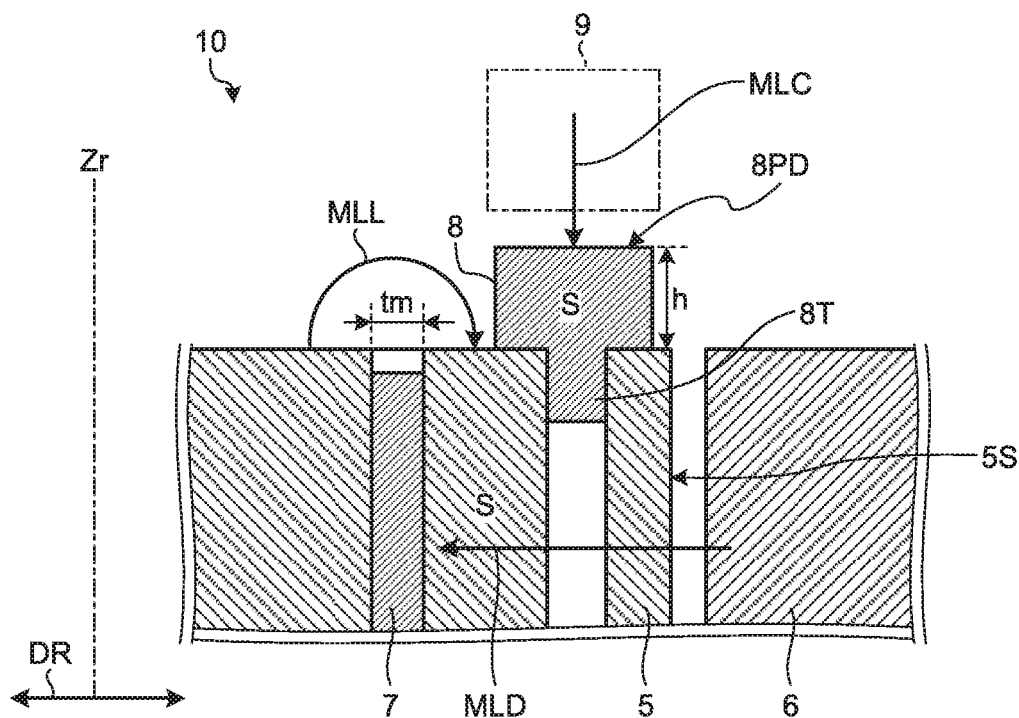
FIG. 11 is a diagram illustrating a magnetic flux of the position detection magnet and a magnetic flux of the driving permanent magnet.

FIG. 10 and FIG. 11 are diagrams illustrating a magnetic flux of the position detection magnet and a magnetic flux of the driving permanent magnet. FIG. 10 and FIG. 11 illustrate a cross section of the rotor 10 taken along a plane including the rotation axis Zr and parallel to the rotation axis Zr. A magnetic flux MLD generated by the driving permanent magnet 7 interacts with a magnetic flux from the stator 6 to rotate the rotor 10. Further, the leakage flux MLL from the driving permanent magnet 7 is generated in the rotor 10. In the first embodiment, in the rotor 10, a leakage flux MLL of the driving permanent magnet 7 and a magnetic flux MLC from the position detection magnet 8 are directed toward an identical direction when the leakage flux MLL leaks out from the second end surface 5TB in FIG. 10. In FIG. 11, a leakage flux MLL of the driving permanent magnet 7 and a magnetic flux MLC from the position detection magnet 8 are directed toward an identical direction when the leakage flux MLL enters the second end surface 5TB.

When the leakage flux MLL from the driving permanent magnet 7 and the magnetic flux MLC of the position detection magnet 8 are directed toward an identical direction, even when the leakage flux MLL from the driving permanent magnet 7 exerts an influence on the magnetic flux MLC of the position detection magnet 8, this influence is minimized as long as the directions of the leakage flux MLL and the magnetic flux MLC are identical to each other. As a result, according to the rotor 10, a decrease in accuracy in detecting the second interpolar portions IMD by the sensor 9 is reduced.

FIG. 10 illustrates a case where the polarity of the driving permanent magnet 7 close to the side surface 5S of the rotor core 5, and the polarity of the position detection magnet 8 are both an N-pole. In this case, the leakage flux MLL from the driving permanent magnet 7 leaks from a section on the second end surface 5TB between the driving permanent magnet 7 and the side surface 5S of the rotor core 5, and then enters into a section on the inner side of the driving permanent magnet 7 in the radial direction DR. The magnetic flux MLC of the position detection magnet 8 is directed away from the end surface 8PD facing to the sensor 9. FIG. 11 illustrates a case where the polarity of the driving permanent magnet 7 close to the side surface 5S of the rotor core 5, and the polarity of the position detection magnet 8 are both an S-pole. In this case, the leakage flux MLL from the driving permanent magnet 7 leaks from a section on the inner side of the driving permanent magnet 7 in the radial direction DR and then enters into a section between the driving permanent magnet 7 and the side surface 5S of the rotor core 5. The magnetic flux MLC of the position detection magnet 8 is directed toward the end surface 8PD facing to the sensor 9.

As described above, in a cross section of the rotor 10 taken along the plane including the rotation axis Zr and parallel to the rotation axis Zr, the polarity of the driving permanent magnet 7 close to the side surface 5S of the rotor core 5 is identical to the polarity of the position detection magnet 8. Thus, the leakage flux MLL from the driving permanent magnet 7 in the axial direction, and the magnetic flux MLC of the position detection magnet 8 are directed toward an identical direction. That is, in the circumferential direction C of the rotor core 5, when the polarity of the driving permanent magnet 7 close to the side surface 5S of the rotor core 5 is identical to the polarity of the position detection magnet 8, the leakage flux MLL from the driving permanent magnet 7 in the axial direction and the magnetic flux MLC of the position detection magnet 8 are directed toward an identical direction.

As illustrated in FIG. 10 and FIG. 11, it is preferable that a dimension h of the position detection magnet 8 in the axial direction is equal to or greater than a thickness tm that is a dimension of the driving permanent magnet 7 in a direction orthogonal to the rotation axis Zr, that is, in the radial direction DR of the rotor core 5. The leakage flux MLL from the driving permanent magnet 7 in the axial direction passes through the end surface 8PD facing to the sensor 9, that is, an end surface on the opposite side to the protrusion 8T in the axial direction. The leakage flux MLL from the driving permanent magnet 7 in the axial direction leaks in such a manner as to draw an arc. Thus, the dimension h of the position detection magnet 8 in the axial direction is set equal to or greater than the thickness tm of the driving permanent magnet 7, thereby reducing the influence of the leakage flux MLL from the driving permanent magnet 7 on the magnetic flux MLC of the position detection magnet 8. As a result, according to the rotor 10, a decrease in accuracy in detecting the second interpolar portions IMD by the sensor 9 can be reduced. If the dimension h of the position detection magnet 8 in the axial direction is excessively increased, the dimension of the rotary electric machine 1 in the axial direction is increased. Thus, the dimension h of the position detection magnet 8 in the axial direction is set equal to or less than 2 times the thickness tm of the driving permanent magnet 7, preferably equal to or less than 1.5 times the thickness tm. In this manner, the dimension of the rotary electric machine 1 in the axial direction can be prevented from being excessively increased, while the influence of the leakage fluxes MLL from the driving permanent magnets 7 is suppressed.

Figure 12:
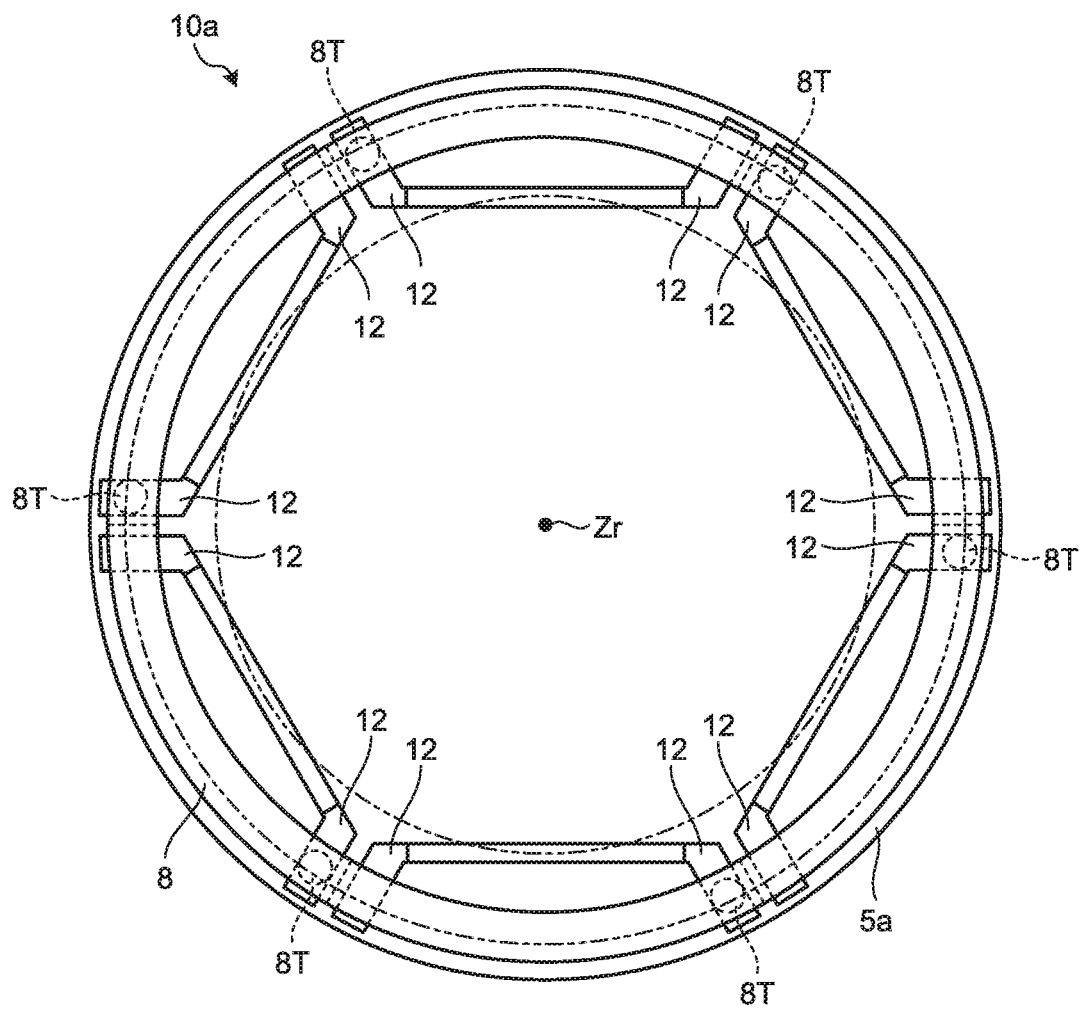
FIG. 12 is a plan view of a rotor according to a modification of the first embodiment as viewed from the side of a position detection magnet.

FIG. 12 is a plan view of a rotor according to a modification of the first embodiment as viewed from the side of a position detection magnet. In the modification, the protrusions 8T of the position detection magnet 8 are inserted into some of the second through holes 12 of the rotor core 5a. The position detection magnet 8 is positioned on the rotor core 5a by the protrusions 8T and the second through holes 12. The rotor core 5 described above includes the holes 13 into which the protrusions 8T are correspondingly inserted; however, each of the holes 13 is a hollow, it affects the magnetic fluxes MLD of the driving permanent magnets 7. A rotor 10a according to the modification does not require the holes 13 because the protrusions 8T are inserted into some of the second through holes 12. As a result, the rotor 10a can minimize the influence on the magnetic fluxes MLD of the driving permanent magnets 7, and can also position the position detection magnet 8 on the rotor core 5a. Therefore, according to the rotor 10a, the magnetic fluxes MLD of the driving permanent magnets 7 can be effectively used.

In the first embodiment and its modification, in the rotor 10 and 10a, the position detection magnet 8 is disposed on the second end surface 5TB in the axial direction of the rotor core 5, at a position different in the radial direction DR from the positions at which the driving permanent magnets 7 are disposed. Due to this structure, the position detection magnet 8 does not overlap with the driving permanent magnets 7 in both the axial direction and the radial direction DR of the rotor core 5. Consequently, the position detection magnet 8 is less affected by the leakage fluxes MLL from the driving permanent magnets 7 and by the magnetic fluxes MLD of the driving permanent magnets 7 which interact with a magnetic flux of the stator 6 to rotate the rotor 10. As a result, the rotor 10 and 10a can reduce a decrease in accuracy in detecting the position of the rotor 10 and 10a by the sensor 9.

The rotary electric machine 1 that includes the rotor 10 (10a) according to the first embodiment and its modification can improve the accuracy in detecting the position of the rotor 10 (10a) by the sensor 9. Thus, according to the rotary electric machine 1, malfunctions can be reduced and a highly-efficient operation is achieved. The rotary electric machine 1 that includes the rotor 10 (10a) improves its efficiency and accordingly reduces its energy consumption. In the rotary electric machine 1 that includes the rotor 10 (10a) malfunctions are reduced and consequently deterioration in durability caused by the malfunctions is reduced. The configuration in the first embodiment and its modification can be appropriately applied to the following embodiments.

Second Embodiment

Figure 13:
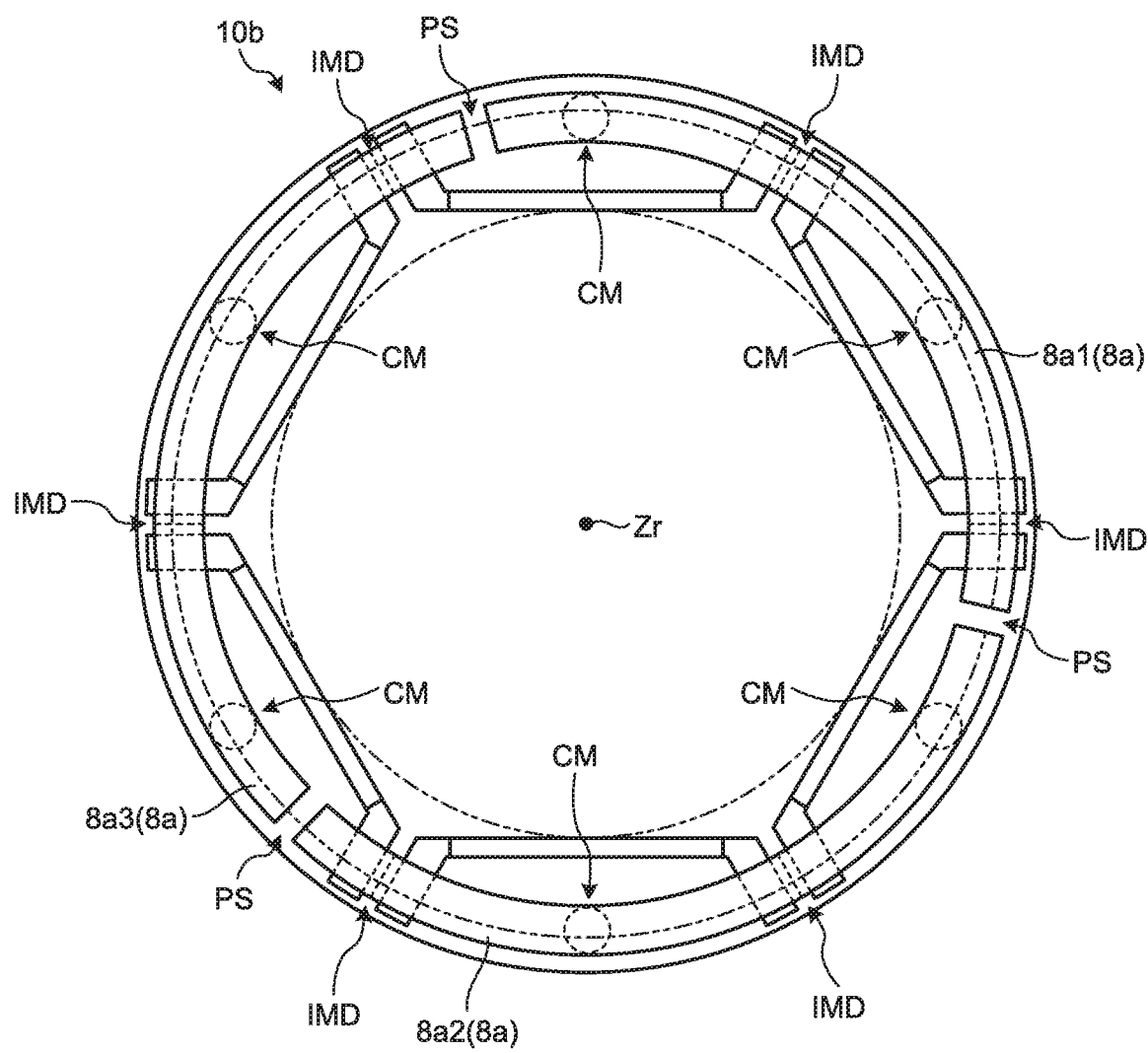
FIG. 13 is a plan view of a rotor according to a second embodiment as viewed from the side of a position detection magnet.
Figure 14:
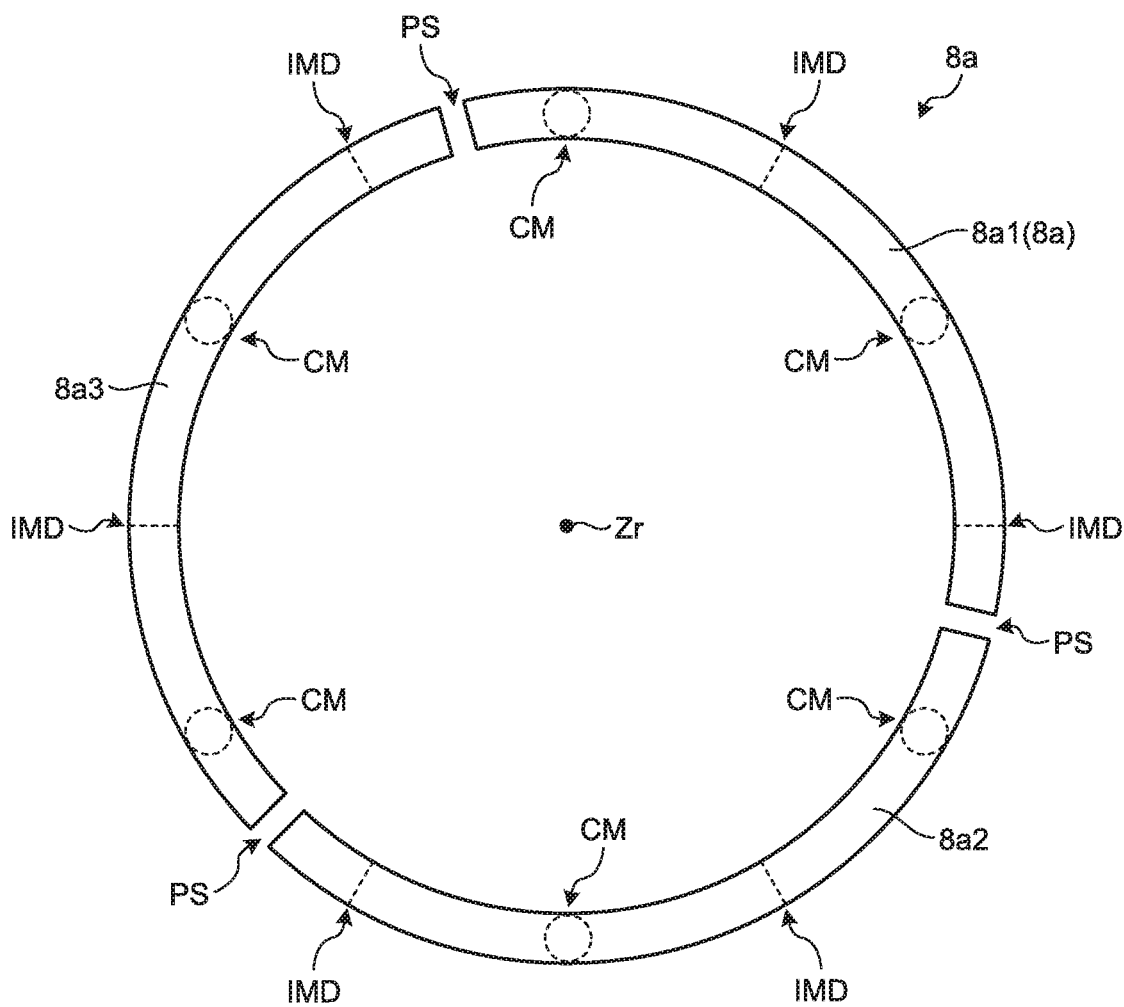
FIG. 14 is a plan view illustrating the position detection magnet according to the second embodiment.

FIG. 13 is a plan view of a rotor according to a second embodiment as viewed from the side of a position detection magnet. FIG. 14 is a plan view illustrating the position detection magnet according to the second embodiment. A position detection magnet 8a according to the second embodiment is obtained by dividing the annular position detection magnet 8 according to the first embodiment and its modification into three. Other configurations of the second embodiment are identical to those of the first embodiment and the modifications thereof.

Where the number of poles of the position detection magnet 8a before being divided is represented as P, and N is a natural number, it is sufficient that the division number satisfies a relation P/N. Thus, the division number is not limited to three. In the second embodiment, the number of poles P of the position detection magnet 8a before being divided is 6, and N is 2. Where N=1, the number of poles P is divided by 1, and thus the position detection magnet 8a is not divided. That is, where N=1, the position detection magnet 8a is equivalent to the position detection magnet 8 according to the first embodiment.

The position detection magnet 8a in a rotor 10b includes a first position detection magnet 8a1, a second position detection magnet 8a2, and a third position detection magnet 8a3. The first position detection magnet 8a1, the second position detection magnet 8a2, and the third position detection magnet 8a3 are arc-shaped as viewed from the extending direction of the rotation axis Zr. These magnets are combined as an annular position detection magnet 8a.

It is preferable that the position detection magnet 8 according to the first embodiment has a dimension in a radial direction as large as possible in order to improve the detection accuracy of the sensor 9. However, as the dimension of the position detection magnet 8 in the radial direction is larger, the size of a die used for molding the position detection magnet 8 is increased. Thus, there is a possibility in that the productivity is decreased. Therefore, in the second embodiment, a plurality of magnets that are the first position detection magnet 8a1, the second position detection magnet 8a2, and the third position detection magnet 8a3 are combined as a single annular position detection magnet 8a. Due to this structure, a die for molding the first position detection magnet 8a1, the second position detection magnet 8a2, and the third position detection magnet 8a3 can be downsized and shared between these magnets. As a result, a decrease in productivity of the position detection magnet 8a can be reduced while manufacturing cost for the die is reduced.

Figure 15:
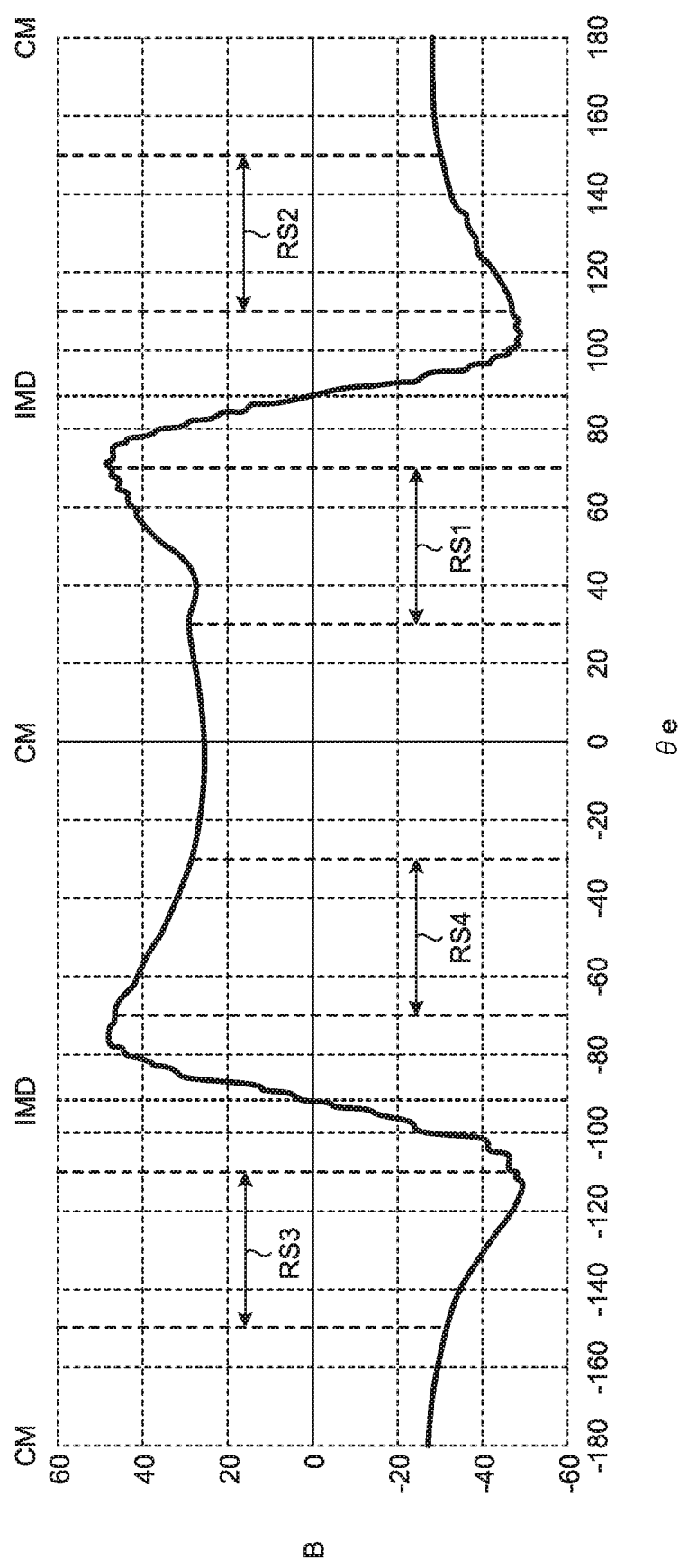
FIG. 15 is a diagram illustrating a waveform of a magnetic flux density of the position detection magnet.

FIG. 15 is a diagram illustrating a waveform of a magnetic flux density of the position detection magnet. In FIG. 15, the vertical axis represents the magnetic flux density B, and the horizontal axis represents the electrical angle θe of the position detection magnet 8a before being divided. The position at which the electrical angle θe is 0 degree and ±180 degrees indicates the magnetic pole center CM of the position detection magnet 8a, that is, the position detection magnet 8 according to the first embodiment. When the position detection magnet 8 is divided, the magnetic flux density B at a divided point PS is decreased. Therefore, it is preferable that the position detection magnet 8a is divided at a point with a relatively high magnetic flux density B.

The position detection magnet 8a before being divided has relatively high absolute values of magnetic flux density B within a range RS1 where the electrical angle θe is equal to or greater than 30 degrees and equal to or smaller than 70 degrees, within a range RS2 where the electrical angle θe is equal to or greater than 110 degrees and equal to or smaller than 150 degrees, within a range RS3 where the electrical angle θe is equal to or greater than −150 degrees and equal to or smaller than −110 degrees, and within a range RS4 where the electrical angle θe is equal to or greater than −70 degrees and equal to or smaller than −30 degrees. Each of the ranges RS1, RS2, RS3, and RS4 is between the magnetic pole center CM and the second interpolar portion IMD. The position detection magnet 8a is divided at a point that falls within any one of the ranges RS1, RS2, RS3, and RS4. Thus, each of the division points PS is provided within any one of the ranges RS1, RS2, RS3, and RS4. As a result, a decrease in the absolute values of magnetic flux density B at the division points PS of the position detection magnet 8a is reduced. Further, each of the division points PS is provided within any one of the ranges RS1, RS2, RS3, and RS4 with relatively high absolute values of magnetic flux density B. Therefore, the division points PS are disposed at a position away from the second interpolar portions IMD where the magnetic flux density B becomes zero. This reduces a decrease in accuracy in detecting the position of the second interpolar portions IMD of the position detection magnet 8a by the sensor 9.

Third Embodiment

Figure 16:
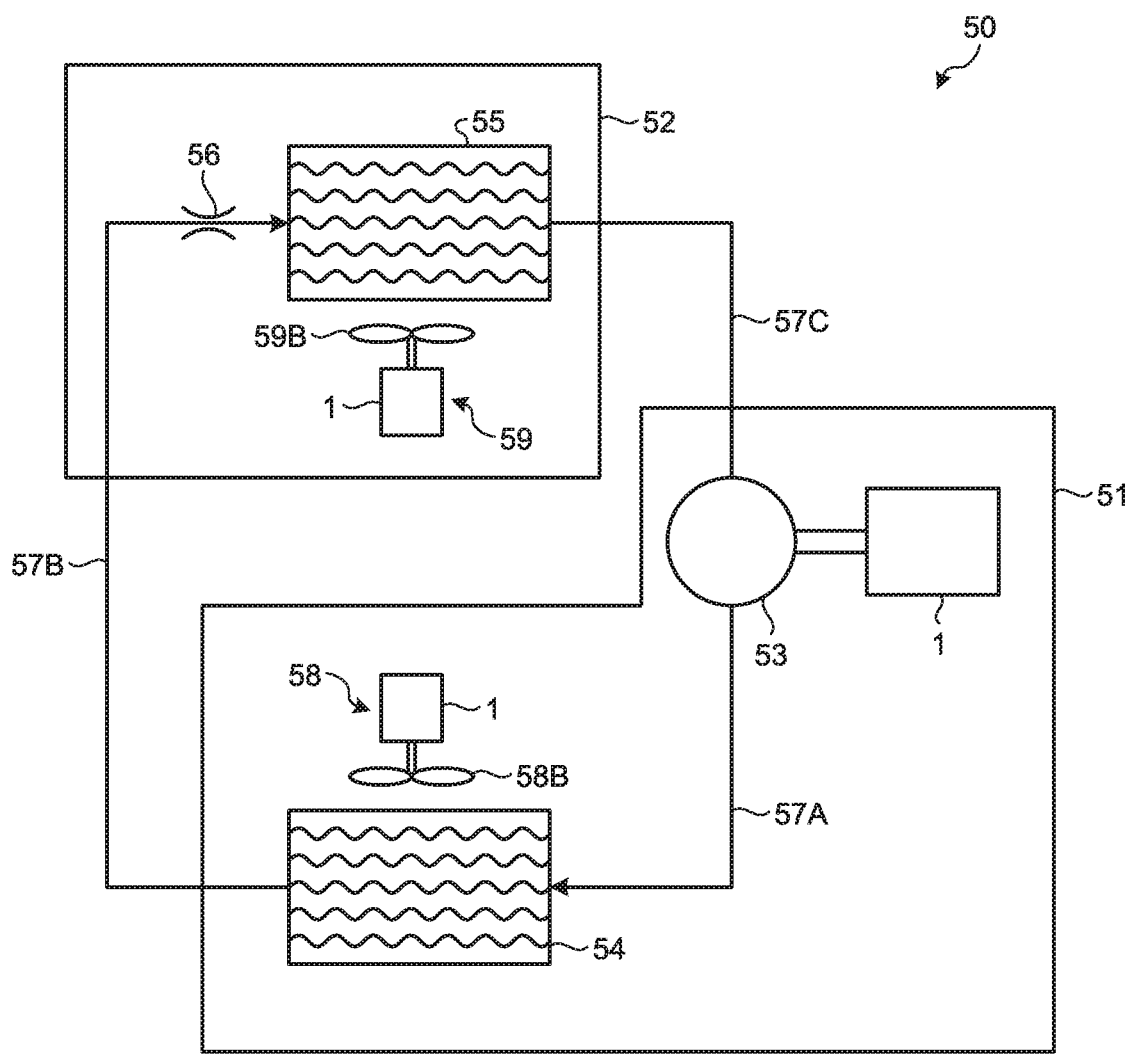
FIG. 16 is a diagram illustrating an air conditioning apparatus according to a third embodiment.

FIG. 16 is a diagram illustrating an air conditioning apparatus according to a third embodiment. An air conditioning apparatus 50 includes an outdoor unit 51 and an indoor unit 52. The outdoor unit 51 includes a compressor 53 that is driven by the rotary electric machine 1 and compresses a refrigerant, and a condenser 54 that condenses the refrigerant compressed by the compressor 53. The outdoor unit 51 further includes a fan 58 that delivers air to the condenser 54. The fan 58 includes the rotary electric machine 1 and an impeller 58B driven by the rotary electric machine 1. The compressor 53 and the condenser 54 are connected by a pipe 57A through which a refrigerant passes.

The indoor unit 52 includes an evaporator 55 that evaporates the refrigerant condensed by the condenser 54. The indoor unit 52 further includes a fan 59 that delivers air to the evaporator 55 and an expansion valve 56 that expands a liquid-phase refrigerant condensed by the condenser 54 to be flowed into the evaporator 55. The fan 59 includes the rotary electric machine 1 and an impeller 59B driven by the rotary electric machine 1. The condenser 54 and the evaporator 55 are connected by a pipe 57B through which a refrigerant passes. The expansion valve 56 is attached in the middle of the pipe 57B. The evaporator 55 and the compressor 53 are connected by a pipe 57C through which a refrigerant passes.

Each of the rotary electric machines 1 that drives the compressor 53, the impeller 58B of the fan 58, or the impeller 59B of the fan 59 includes any one of the rotor 10 according to the first embodiment, the rotor 10a according to the modification of the first embodiment, and the rotor 10b according to the second embodiment. Thus, according to the rotary electric machine 1, the accuracy in detecting the position of the rotor 10, 10a, 10b by the sensor 9 can be improved. Accordingly, it is possible to reduce malfunctions of the rotary electric machine 1 and achieve improvement in its efficiency. According to the air conditioning apparatus 50 that includes the rotary electric machine 1 as described above, malfunctions can be reduced and a highly-efficient operation can be achieved.

The configurations described in the above embodiments are only examples of the content of the present invention. The configurations can be combined with other well-known techniques, and a part of each configuration can be omitted or modified without departing from the scope of the present invention.

The invention claimed is:

1. A rotary electric machine, comprising:
    a rotor core that rotates about a rotation axis;
    a plurality of first magnets disposed in a circumferential direction of the rotor core and embedded in the rotor core;
    a second magnet that includes a plurality of magnetic poles disposed in the circumferential direction of the rotor core and is disposed on an end surface of the rotor core in an extending direction of the rotation axis, an entire region of the plurality of magnetic poles of the second magnet being disposed in a direction orthogonal to the rotation axis and on a radially outer side of an entire region of the plurality of first magnets; and
    a stator provided on an outer side of the rotor core in the direction orthogonal to the rotation axis.

2. The rotary electric machine according to claim 1, wherein a first interpolar portion between adjacent ones of the first magnets and a second interpolar portion between adjacent ones of the magnetic poles are disposed at an identical position in the circumferential direction.

3. The rotary electric machine according to claim 2, wherein the first magnets are disposed away from an inner side of a portion between the adjacent magnetic poles in the direction orthogonal to the rotation axis.

4. The rotary electric machine according to claim 1, wherein a polarity of each one of the first magnets is identical to a polarity of one of the plurality of magnetic poles of the second magnet to which the one first magnet faces, and a leakage flux from each of the first magnets in the extending direction of the rotation axis and a magnetic flux of the second magnet are directed toward an identical direction.

5. The rotary electric machine according to claim 4, wherein a dimension of the second magnet in an extending direction of the rotation axis is equal to or greater than a dimension of each of the first magnets in a direction orthogonal to the rotation axis, and is equal to or less than two times the dimension of the first magnets.

6. The rotary electric machine according to claim 1, wherein
    the rotor core includes two through holes between adjacent ones of the first magnets, the through holes extending through the rotor core in the extending direction of the rotation axis and being disposed in the circumferential direction, and
    a dimension of each of the through holes in the circumferential direction is 1.5 or more times greater than a dimension of a gap between the rotor core and the stator in the direction orthogonal to the rotation axis.

7. The rotary electric machine according to claim 1, wherein
    the rotor core includes two through holes between adjacent ones of the first magnets, the through holes extending through the rotor core in the extending direction of the rotation axis and being disposed in the circumferential direction, and
    an angle formed by an inner wall of one of the through holes that is closer to one of the adjacent first magnets, the rotation axis, and an inner wall of an another of the through holes that is closer to an another of the adjacent first magnets is equal to or greater than an electrical angle of the second magnet that is 20 degrees.

8. The rotary electric machine according to claim 1, wherein
    the rotor core includes two through holes disposed between adjacent ones of the first magnets and radially outside the first magnets, the through holes extending through the rotor core in the extending direction of the rotation axis and being disposed in the circumferential direction of the rotor core, and
    the second magnet includes protrusions protruding in the extending direction of the rotation axis and inserted into the through holes.

9. The rotary electric machine according to claim 1, wherein
    the second magnet includes protrusions protruding in the extending direction of the rotation axis, and
    the rotor core includes holes through which the protrusions are inserted on an outer side of the first magnets in the direction orthogonal to the rotation axis.

10. The rotary electric machine according to claim 1, wherein a dimension of the second magnet in the extending direction of the rotation axis is equal to or greater than a dimension of the first magnet in the direction orthogonal to the rotation axis.

11. An air conditioning apparatus comprising:
    the rotary electric machine according to claim 1;
    a compressor that is driven by the rotary electric machine and compresses a refrigerant;
    a condenser that condenses the refrigerant compressed by the compressor; and
    an evaporator that evaporates the refrigerant condensed by the condenser.

* * * * *